United States Patent
Kim

(10) Patent No.: US 8,811,357 B2
(45) Date of Patent: Aug. 19, 2014

(54) METHOD AND APPARATUS FOR TRANSFERRING INFORMATION ON STATION IN WIRELESS MESH NETWORK

(75) Inventor: Hyeong-seok Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1793 days.

(21) Appl. No.: 11/655,243

(22) Filed: Jan. 19, 2007

(65) Prior Publication Data

US 2007/0189192 A1    Aug. 16, 2007

(30) Foreign Application Priority Data

Feb. 10, 2006    (KR) .................. 10-2006-0013006

(51) Int. Cl.
*H04W 88/02* (2009.01)

(52) U.S. Cl.
USPC ........................................... 370/338

(58) Field of Classification Search
USPC ............... 370/338, 351, 389, 328, 254–255, 370/229–237, 310–310.2
See application file for complete search history.

(56) References Cited

U.S. PATENT DOCUMENTS

| | | | |
|---|---|---|---|
| 5,495,479 A | 2/1996 | Galand et al. | |
| 5,963,546 A | 10/1999 | Shoji | |
| 2003/0126299 A1 | 7/2003 | Shah-Heydari | |
| 2003/0179742 A1* | 9/2003 | Ogier et al. | 370/351 |
| 2005/0041591 A1 | 2/2005 | Duggi et al. | |
| 2007/0266143 A1* | 11/2007 | Zeng et al. | 709/224 |

OTHER PUBLICATIONS

Owada, Y et al.; "A study on protocol, implementation and throughput evaluation for multihop wireless LAN," VTC 2003-Spring, The 57TH, IEEE Semiannual Vehicular Technology Conference, Proceedings, Jeju, Korea, Apr. 22-25, 2003, IEEE Vehicular Technolgy Conference, New York, NY, IEEE, US, vol. 4 of 4, Conf. 57, Apr. 22, 2003, pp. 1773-1777.
Ming-Hui Jin et al.; "A hierarchical routing protocol for large scale ad hoc network," Performance, Computing and Communications Conference, 1999 IEEE International Scottsdale, AZ, USA Feb. 10-12, 1999, Piscataway, NJ, USA, IEEE, US, Feb. 10, 1999, pp. 379-385.
Perkins, C., et al., "Ad hoc On-Demand Distance Vector (AODV) Routing," Network Working Group, The Internet Society, Jul. 2003, 33 pages.
Agre, Jonathan, et al., "802.11 TGs Simple Efficient Extensible Mesh (SEE-Mesh) Proposal," IEEE, 802.11-05/0562r1, Sep. 12, 2005, pp. 1-146.

* cited by examiner

*Primary Examiner* — Diane Mizrahi
(74) *Attorney, Agent, or Firm* — Sughrue Mion, PLLC

(57) ABSTRACT

A method and apparatus of transferring information on a station to other nodes in a wireless mesh network if the station is associated in or disassociated from a mesh access point are provided. The apparatus includes detection unit which detects a disassociation or association of the station, a message generation unit which generates a disassociation message or an association message indicating that the station is associated in or disassociated from the mesh access point, a requesting unit which transmits the message to a root node in a tree structure formed using a proactive routing protocol, and a message transmission unit which broadcasts the received message.

14 Claims, 5 Drawing Sheets

FIG. 6
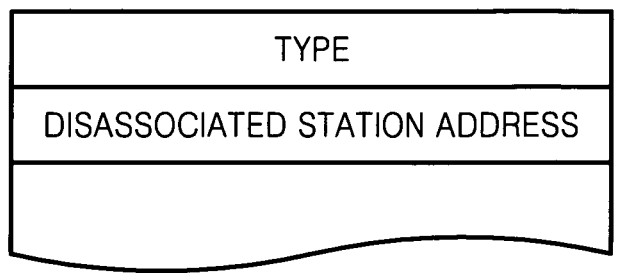
FIG. 7
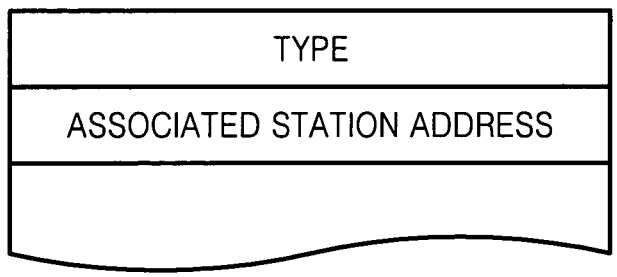
FIG. 8
| TYPE | MESH AP ADDRESS | STATION ADDRESS |
|---|---|---|
| TYPE | MESH AP ADDRESS | STATION ADDRESS |
| . . . | . . . | . . . |

METHOD AND APPARATUS FOR TRANSFERRING INFORMATION ON STATION IN WIRELESS MESH NETWORK

This application claims priority from Korean Patent Application No. 10-2006-0013006, filed on Feb. 10, 2006, in the Korean Intellectual Property Office, the disclosure of which is incorporated herein in its entirety by reference.

BACKGROUND OF THE INVENTION

1. Field of the Invention

Apparatuses and methods consistent with the present invention relate to a wireless mesh network, and more particularly to, a method of transferring information on a station to nodes in a wireless mesh network when the station joins or leaves a mesh access point.

2. Description of the Related Art

The standardization of a wireless mesh network that is an extension of a wireless local area network (LAN) relating to the IEEE 802.11s standards are being discussed. A consortium of companies is proposing a hybrid wireless mesh protocol (HWMP) as a routing protocol to be used in the wireless mesh network. This working group is collectively known as the Simple, Efficient and Extensible Mesh (SEEMesh) group.

The HWMP is a hybrid protocol that uses a proactive routing protocol and a reactive routing protocol together. Using the reactive routing protocol, nodes do not always maintain a routing table of a network, but instead, search a routing path to a destination node until a source node is ready to transmit data. Using the proactive routing protocol, nodes always maintain the routing table. The HWMP uses an ad hoc on-demand distance vector routing (AODV) protocol as the reactive routing protocol.

FIG. 1 is a diagram for searching for a path using the AODV protocol in a wireless mesh network. Referring to FIG. 1, if node A searches for the path for transmitting data to node D, the node A writes an address of the node A in a source address field and an address of the node D in a destination address field of a route requirement (RREQ) packet and broadcasts the RREQ packet. If Node B, which receives the RREQ packet, recognizes that node A is searching for the path to node D, node B registers with a routing table that the node B is one hop from node A based on a hop count field of the RREQ packet, and then broadcasts the RREQ packet.

Node C, which receives the RREQ packet from node B, registers with a routing table that node B is a next hop for the path to the node A, and then broadcasts the RREQ packet.

If node D, which receives the RREQ packet from node C, recognizes that the RREQ packet is transmitted to the node D according to the destination address of the RREQ packet, then node D generates a route response (RREP) packet having node A as its destination, transmits the RREP packet to the node C via unicast, and registers node C in a precursor list of an address of the node D.

Then node C, which receives the RREP packet from node D, finds through the routing table that the node B is the next hop for the path to the node A, transmits the RREP packet to the node B via unicast, and registers the node B in a precursor list of node D. Likewise, node B transmits the received RREP packet to the node A and registers node A in the precursor list of node D, thereby searching for the path between the node A and the node D.

The precursor list is used when a link between nodes is disconnected or no more paths are searched. For example, if node C recognizes that node C and the node D are disconnected, then node C determines node D as a destination node and informs nodes communicating with node C of the fact, which is performed for node C to transmit a route error (RERR) packet to nodes registered with the precursor list of node D in the routing table of node C. As described above, since node B is registered in the precursor list of node D in the routing table of node C, based on this fact, node C transmits the RERR packet to the node B, and then node B, which received the RERR packet, also transmits the REPP packet to the node A registered in the precursor list of the node D, so that all nodes that have the node D as the destination node receive the RERR packet and recognize that the path between all nodes and the node D is disconnected.

FIG. 2 is a diagram for explaining a related art method of forwarding information on a station when the station moves. Referring to FIG. 2, it is assumed that nodes A through I are mesh access points that comprise an access point function and an ad-hoc routing function in accord with 802.11.

When station 1 moves from a service area of mesh access point J to an area of mesh access point G, the mesh access point J recognizes that the station 1 is out of the service area of the mesh access point J and transmits an RERR packet to nodes registered in a precursor list of station 1 as described with reference to FIG. 1. For example, if node A and node C communicate with the station 1, all nodes between the node A and node J and all nodes between the node C and the node J over a path receive the RERR packet.

The RERR packet must be transmitted to nodes whenever a hand-off of a station occurs. If stations very frequently move in a wireless mesh network, hand-offs occur frequently. In particular, if a lot of stations exist in the wireless mesh network, the RERR packet is frequently used due to hand-offs or link disconnections, consuming network resources.

Also, the existing HWMP standards do not clearly describe how a root node and other mesh access points can recognize that the station 1 newly joins the service area of the mesh access point G.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above. Accordingly, the various aspects of the present invention provide a method and apparatus for reducing a network overhead and informing other nodes of association or disassociation of a station in a wireless mesh network.

According to an aspect of the present invention, there is provided a method of transferring information on a station using a mesh access point in a wireless mesh network, the method comprising: (a) if a disassociation of the station is detected, generating a disassociation message indicating that the station is disassociated from the mesh access point; and (b) requesting a mesh portal designated as a root node in a tree structure formed using a proactive routing protocol to insert the disassociation message into a message regularly broadcasted by the mesh portal to maintain the tree structure, terminating the uploading of the contents.

Operation (b) may comprise: transmitting the disassociation message to the mesh portal along a path in the tree structure via unicast.

A computer-readable storage medium having embodied thereon a computer program for executing the method.

According to another aspect of the present invention, there is provided a mesh access point apparatus in a wireless mesh network comprising: a message generation unit, if a disassociation of the station is detected, generating a disassociation message indicating that the station is disassociated from the mesh access point; and a request unit requesting a mesh portal designated as a root node in a tree structure formed using a proactive routing protocol to insert the disassociation message into a message regularly broadcasted by the mesh portal to maintain the tree structure, terminating the uploading of the contents.

The request unit may transmit the disassociation message to the mesh portal along a path in the tree structure via unicast to request the mesh portal to insert the disassociation message.

The message generation unit, if an association of another station is detected, may generate an association message indicating that the station belongs to the mesh access point, and the request unit may request the mesh portal to insert the association message into the message regularly broadcasted by the mesh portal to maintain the tree structure, terminating the uploading of the contents.

According to another aspect of the present invention, there is provided a method of transferring data using a mesh portal designated as a root node in a wireless mesh network in which nodes form a tree structure through a proactive routing protocol, the method comprising: (a) determining whether a message received from a mesh access point is a disassociation message or an association message of a station; and (b) selectively inserting the received message into a message regularly broadcasted by the mesh portal to maintain the tree structure based on the determination result.

In operation (b), if a set period of time elapses, the received message may be no longer inserted into the regularly broadcasted message.

A computer-readable storage medium having embodied thereon a computer program for executing the method.

According to another aspect of the present invention, there is provided a mesh portal apparatus designated as a root node in a wireless mesh network in which nodes form a tree structure through a proactive routing protocol, the apparatus comprising: a determination unit which determines whether a message received from a mesh access point is a disassociation message or an association message of a station; and a message processing unit which selectively inserts the received message into a message regularly broadcasted by the mesh portal to maintain the tree structure based on the determination result.

BRIEF DESCRIPTION OF THE DRAWINGS

The above and other aspects and features of the present invention will become more apparent by describing in detail exemplary embodiments thereof with reference to the attached drawings in which:

FIG. 6 is a diagram of a format of a disassociation message according to an exemplary embodiment of the present invention;

FIG. 7 is a diagram of a format of an association message according to an exemplary embodiment of the present invention;

FIG. 8 is a diagram of a format of a root announcement (RA) message according to an exemplary embodiment of the present invention.

DETAILED DESCRIPTION OF THE EXEMPLARY EMBODIMENTS

The present invention will now be described more fully with reference to the accompanying drawings.

Figure 1:
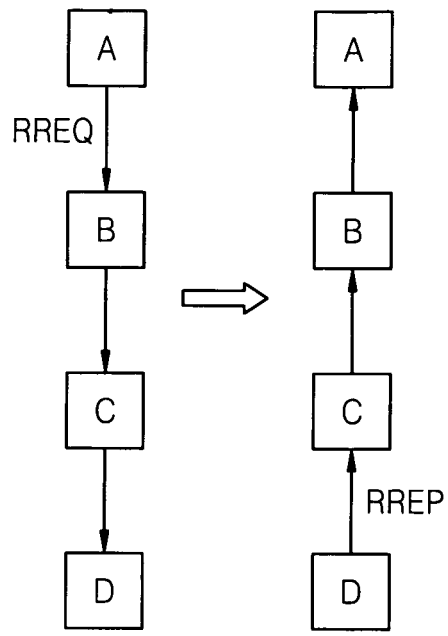
FIG. 1 is a diagram for searching for a path using an ad hoc on-demand distance vector routing (AODV) protocol in a wireless mesh network.
Figure 2:
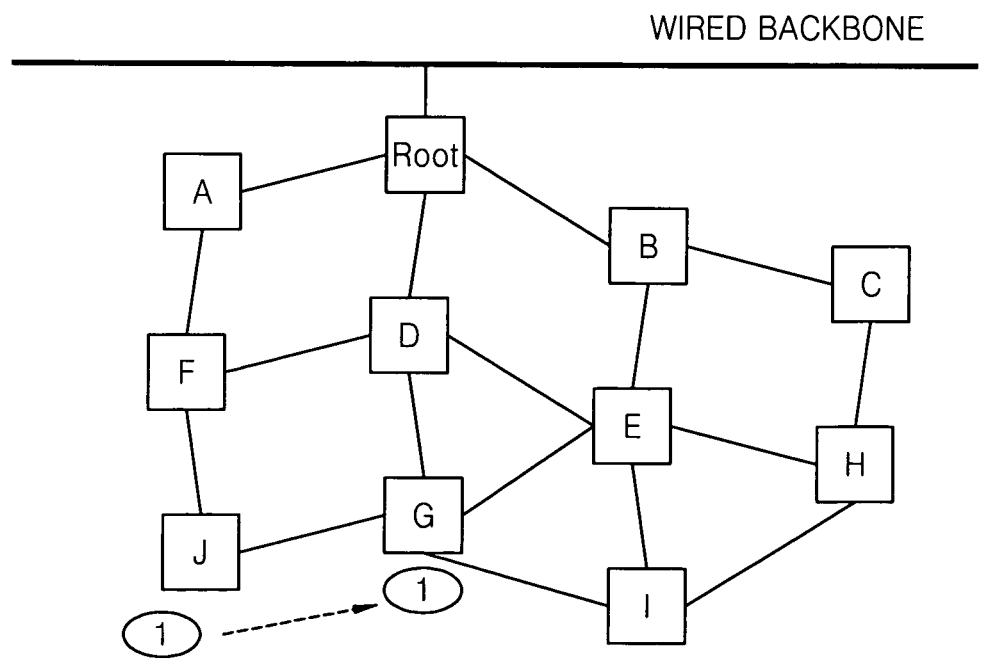
FIG. 2 is a diagram for explaining a related art method of transferring information on a station when the station moves.
Figure 3:
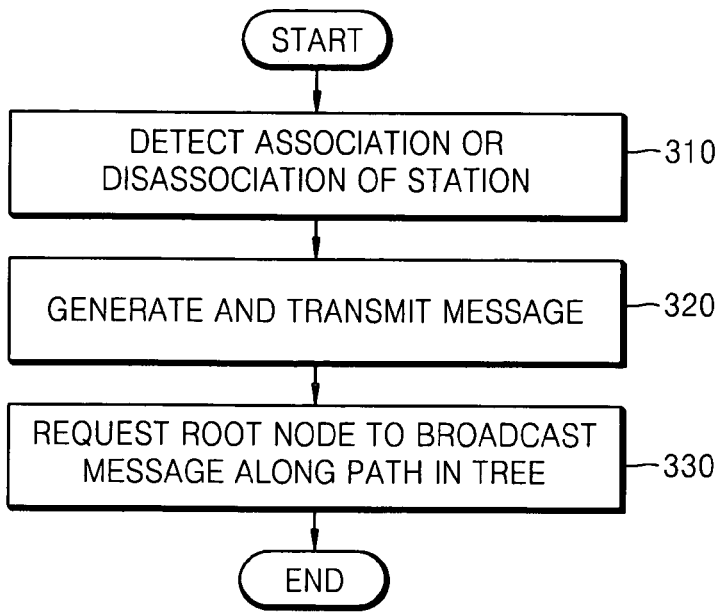
FIG. 3 is a flowchart of a method of transferring information on a station using a mesh access point according to an exemplary embodiment of the present invention.

FIG. 3 is a flowchart of a method of transferring information on a station using a mesh access point according to an exemplary embodiment of the present invention. Referring to FIG. 3, if the mesh access point recognizes association or disassociation of the station (Operation 310), the mesh access point generates a message indicating the association or disassociation of the station using an address of the station and an address of the mesh access point (Operation 320), transmits the message to a root node via a path over a tree formed using a proactive protocol, and requests the root node to broadcast the message to a wireless mesh network (Operation 330). Therefore, the present invention can inform all nodes communicating with the station, without using an RREQ packet, of the disassociation of the station, and inform the root node and other nodes of the association of the station.

In connection with a tree structure and the root node, as described in the related art, a HWMP uses a proactive routing protocol instead of an AODV protocol that is a reactive routing protocol. Using the proactive routing protocol, nodes (except stations) in the wireless mesh network form the tree structure in that a specific mesh portal is designated as the root node, and a routing table is maintained for the tree structure. If a path formed using the AODV protocol does not exist or routing information is deleted after time elapsed, nodes of the wireless mesh network using the HWMP transmit a packet to the root node via the path over the tree using the routing table, and the root node routes the received packet to a node according to a destination node address.

The mesh portal is a node connected to an external network wired and which connects the wireless mesh network to the external network. Its detailed description is omitted since the mesh portal is described in various publications relating to the wireless mesh network.

Figure 4:
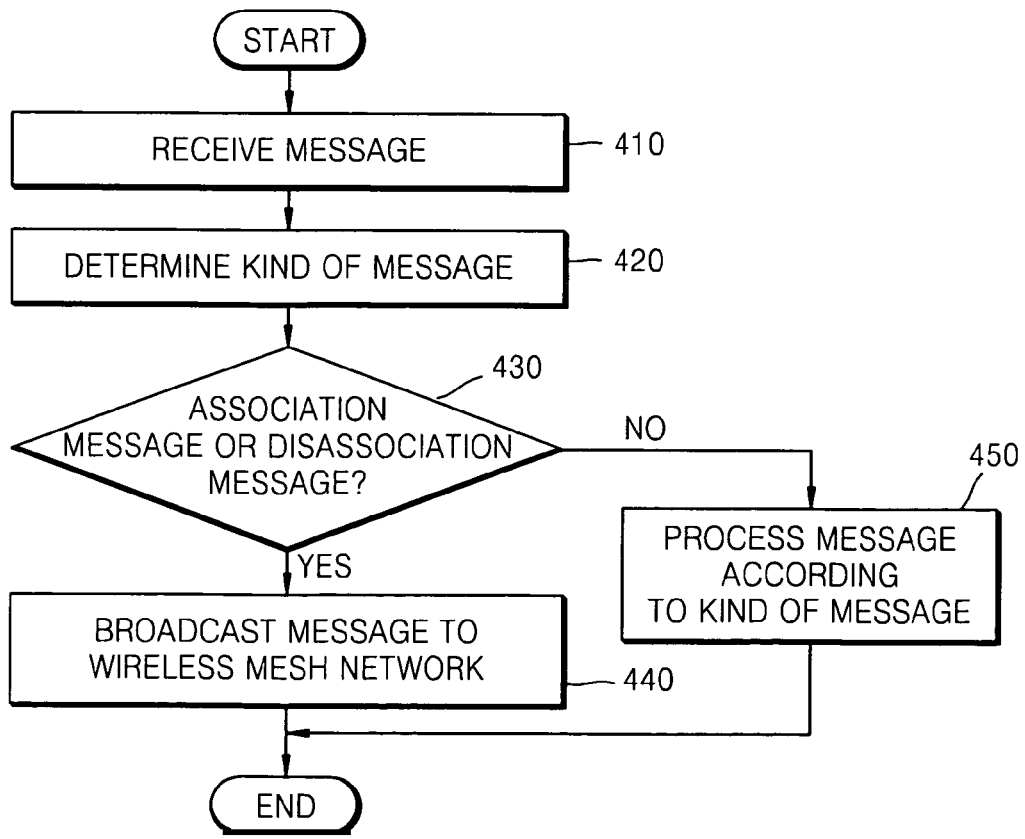
FIG. 4 is a flowchart of a method of transferring information on a station using a mesh portal according to an exemplary embodiment of the present invention.

FIG. 4 is a flowchart of a method of transferring information on a station using a mesh portal according to an exemplary embodiment of the present invention. Referring to FIG. 4, the mesh portal is a node designated as a root node in a tree structure formed using a proactive protocol.

If the mesh portal receives a message from another node (Operation 410), the mesh portal analyzes the received message and determines whether the message indicates that the station is disassociating from a mesh access point or associating a new mesh access point (Operations 420 and 430). If it is determined that the received message indicates the association or disassociation of the station, the mesh portal broadcasts the message to the wireless mesh network and informs nodes pertaining to the wireless mesh network that the station disassociates from an existing service area or associates a service area of a new mesh access point. If it is determined that the received message does not indicate the association or disassociation of the station, for example, if the message is transferred to other nodes, the mesh portal performs an appropriate operation such as transferring the message to a destination node, and processes the message accordingly (Operation 450).

Figure 5:
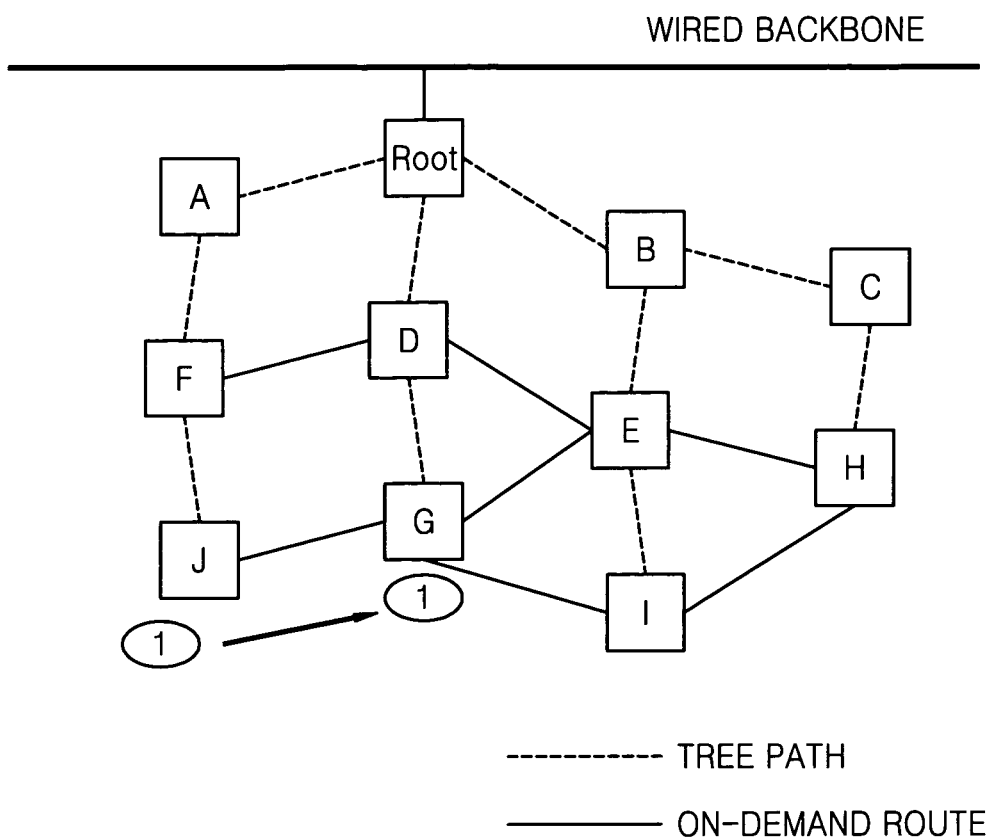
FIG. 5 is a diagram for explaining an information flow when a station moves in a wireless mesh network according to an exemplary embodiment of the present invention.

FIG. 5 is a diagram for explaining an information flow when a station moves in a wireless mesh network according to an exemplary embodiment of the present invention. Referring to FIG. 5, it is assumed that nodes A through I are all mesh access points.

The wireless mesh network using a HWMP uses an AODV protocol that is a reactive routing protocol in addition to the proactive routing protocol. Using the proactive routing protocol, a routing table having a tree structure is maintained as described with reference to FIG. 3. A solid-lined path is set using the AODV protocol, whereas a dot-lined path is set using the proactive routing protocol.

If station 1 moves from a service area of mesh access point J to a service area of mesh access point G, the mesh access point J recognizes the movement of the station 1 and generates a disassociation message indicating that the station 1 is disassociated from the service area of the mesh access point J and transmits the disassociation message to a root node. The disassociation message may be transmitted to the root node through a path over a tree structure, i.e., mesh access points F and A, via unicast.

The disassociation message includes a field indicating that the message is the disassociation message and a field indicating an address of the disassociated station 1 as illustrated in FIG. 6.

If the station 1 moves a service area of mesh access point G, the mesh access point G generates an association message indicating that the station 1 newly associates in the service area of the mesh access point G and transmits the message to the root node. The association message also may be transmitted to the root node through the path over the tree structure, i.e., mesh access point D, via unicast.

The association message includes a field indicating that the message is the association message and a field indicating an address of the associated station 1 as illustrated in FIG. 7.

The root node that received the disassociation message transmitted from the mesh access point J and the association message transmitted from the mesh access point G broadcasts these messages in the wireless mesh network. In order to reduce the network overhead, the root node may insert these messages into a regularly broadcasted root announcement (RA) message and transmit the RA message. The RA message is a packet used to maintain the tree structure for the mesh portal designated as the root node having the tree structure in the wireless mesh network using the HWMP. However, a message indicating that a specific station at the same case, i.e., at a specific time, associates or disassociates a service area of a specific mesh access point may be inserted into the RA message for a set period of time to be transmitted the RA message. If not, the size of the RA message including every piece of information on the association and disassociation of all previous stations will be increased.

FIG. 8 is a diagram of a format of the RA message according to an exemplary embodiment of the present invention. Referring to FIG. 8, the RA message includes a type field, a mesh access point address field, and a station address field. In detail, a disassociation message or association message is inserted into the RA message. If the type field has a value corresponding to the disassociation message, it indicates that a station corresponding to the station address of the same line is disassociated from a mesh access point corresponding to the mesh access point address of the same line, which is applied when the type field has a value corresponding to the association message.

Nodes of a wireless mesh network that receive these messages analyze each of the three fields to recognize changes in the disassociation and association of the station.

Figure 9:
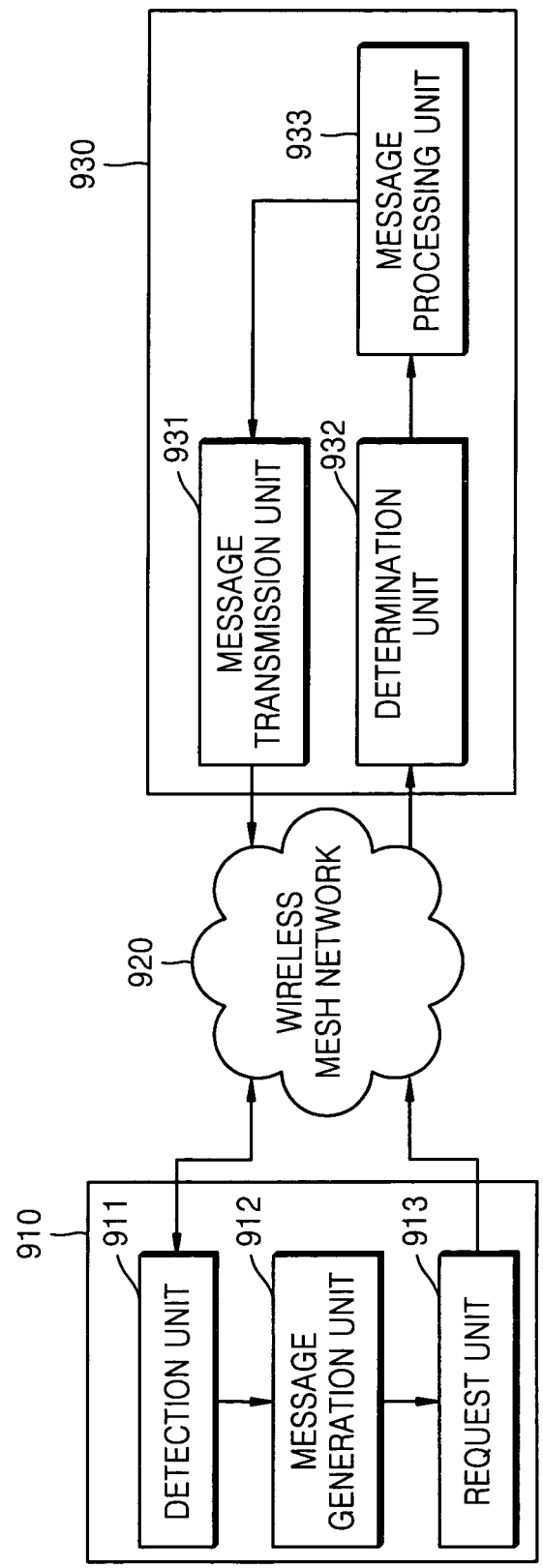
FIG. 9 is a block diagram of a mesh portal and a mesh access point according to an exemplary embodiment of the present invention.

FIG. 9 is a block diagram of a mesh portal 930 and a mesh access point 910 according to an exemplary embodiment of the present invention. The mesh portal is a root node.

Referring to FIG. 9, the mesh access point 910 of the current exemplary embodiment comprises a detection unit 911, a message generation unit 912, and a request unit 913. The mesh portal 930 comprises a message processing unit 933, a determination unit 932, and a message transmission unit 931.

With regard to the mesh access point 910, the detection unit 911 detects association or disassociation of a station. The message generation unit 912 generates a message according to the detection performed by the detection unit 911, and transmits the message to the request unit 913. The request unit 913 transmits the received message to the mesh portal 930 that is the root node along a tree path via unicast to request the wireless mesh network 920 to broadcast the message.

The mesh portal 930 designated as the root node in a tree structure formed using a proactive protocol will now be described.

If a message is received from a station or the mesh access point 910, the determination unit 932 determines the message type based on a type field of the received message, if the received message is a disassociation message or an association message, the determination unit 932 transmits the message to the message processing unit 933. The determination unit 932 also inserts the received message into an RA message that is regularly broadcasted to the wireless mesh network 920. The message transmission unit 931 broadcasts the RA message including the disassociation message or the association message to the wireless mesh network 920.

The present invention may also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves.

When a station leaves an area of a mesh access point in a wireless mesh network, the present invention can more greatly reduce a network overhead than a conventional art while informing other nodes of the leave of the station. Also, when the station enters into a new area of the mesh access point in the wireless mesh network, the present invention provides a mechanism that informs other nodes of the entrance of the station.

While the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method for a mesh access point to transfer information on a station in a wireless mesh network comprising a plurality of mesh access points and a mesh portal which connects the wireless mesh network to an external network via a wired network, the method comprising:

(a) generating, by a processor, a disassociation message indicating that the station is disassociated from the mesh access point, when a disassociation of the station is detected; and (b) requesting the mesh portal designated as a root node in a tree structure formed using a proactive routing protocol to insert the disassociation message into a message regularly broadcasted in order to maintain the tree structure by the mesh portal, wherein the wireless mesh network uses a hybrid wireless mesh protocol (HWMP) including an ad hoc on-demand distance vector (AODV) routing protocol, and wherein the message regularly broadcasted by the mesh portal includes an address of the station coupled with an address of the mesh access point.

2. The method of claim 1, wherein operation (b) comprises: transmitting the disassociation message to the mesh portal along a path in the tree structure via unicast.

3. The method of claim 1, further comprising:

(c) generating an association message indicating that the station belongs to the mesh access point, when an association of another station is detected; and (d) requesting the mesh portal to insert the association message into the message regularly broadcasted by the mesh portal.

4. The method of claim 3, wherein operation (d) comprises: transmitting the association message to the mesh portal along the path in the tree structure via unicast.

5. A computer-readable storage medium having embodied thereon a computer program for executing the method for a mesh access point to transfer information on a station in a wireless mesh network comprising a plurality of mesh access points and a mesh portal which connects the wireless mesh network to an external network via a wired network, the method comprising:

(a) generating, by a processor, a disassociation message indicating that the station is disassociated from the mesh access point, when a disassociation of the station is detected; and (b) requesting the mesh portal designated as a root node in a tree structure formed using a proactive routing protocol to insert the disassociation message into a message regularly broadcasted in order to maintain the tree structure by the mesh portal, wherein the wireless mesh network uses a hybrid wireless mesh protocol (HWMP) including an ad hoc on-demand distance vector (AODV) routing protocol, and wherein the message regularly broadcasted by the mesh portal includes an address of the station coupled with an address of the mesh access point.

6. A mesh access point apparatus in a wireless mesh network comprising a plurality of mesh access points and a mesh portal which connects the wireless mesh network to an external network via a wired network, the apparatus comprising:

a message generation unit which generates a disassociation message indicating that the station is disassociated from the mesh access point, when a disassociation of the station is detected; and a request unit which requests the mesh portal designated as a root node in a tree structure formed using a proactive routing protocol to insert the disassociation message into a message regularly broadcasted in order to maintain the tree structure by the mesh portal, wherein the wireless mesh network uses a hybrid wireless mesh protocol (HWMP) including an ad hoc on-demand distance vector (AODV) routing protocol, and wherein the message regularly broadcasted by the mesh portal includes an address of the station coupled with an address of the mesh access point, and wherein at least one of the message generation unit and the request unit comprises a processor.

7. The apparatus of claim 6, wherein the request unit transmits the disassociation message to the mesh portal along a path in the tree structure via unicast to request the mesh portal to insert the disassociation message.

8. The apparatus of claim 6, wherein the message generation unit generates an association message indicating that the station belongs to the mesh access point, when an association of another station is detected, and the request unit requests the mesh portal to insert the association message into the message regularly broadcasted by the mesh portal.

9. The apparatus of claim 8, wherein the request unit transmits the association message to the mesh portal along the path in the tree structure via unicast to request the mesh portal to insert the association message.

10. A method for a mesh portal designated as a root node to transfer data in a wireless mesh network comprising a plurality of mesh access points and a mesh portal which connects the wireless mesh network to an external network via a wired network, wherein nodes form a tree structure through a proactive routing protocol in the wireless mesh network, the method comprising:

(a) determining, by a processor, whether a message received from a mesh access point is a disassociation message or an association message of a station; and (b) selectively inserting the message received into a message regularly broadcasted in order to maintain the tree structure by the mesh portal based on a determined result, wherein the wireless mesh network uses a wireless mesh protocol (HWMP) including an ad hoc on-demand distance vector (AODV) routing protocol, and wherein the message regularly broadcasted by the mesh portal includes an address of the station coupled with an address of the mesh access point when the message received from the mesh access point is determined to be a disassociation message or an association message of the station.

11. The method of claim 10, wherein, in operation (b), when a set period of time elapses, the received message is no longer inserted into the regularly broadcasted message.

12. A computer-readable storage medium having embodied thereon a computer program for executing the method for a mesh portal designated as a root node to transfer data in a wireless mesh network comprising a plurality of mesh access points and a mesh portal which connects the wireless mesh network to an external network via a wired network, wherein nodes form a tree structure through a proactive routing protocol in the wireless mesh network, the method comprising:

(a) determining, by a processor, whether a message received from a mesh access point is a disassociation message or an association message of a station; and (b) selectively inserting the message received into a message regularly broadcasted in order to maintain the tree structure by the mesh portal based on a determined result, wherein the wireless mesh network uses a wireless mesh protocol (HWMP) including an ad hoc on-demand distance vector (AODV) routing protocol, and wherein the message regularly broadcasted by the mesh portal includes an address of the station coupled with an address of the mesh access point when the message received from the mesh access point is determined to be a disassociation message or an association message of the station.

13. A mesh portal apparatus designated as a root node in a wireless mesh network comprising a plurality of mesh access points and the mesh portal, wherein the mesh portal connects the wireless mesh network to an external network via a wired network and nodes form a tree structure through a proactive routing protocol in the wireless mesh network, the apparatus comprising:
- a determination unit which determines whether a message received from a mesh access point is a disassociation message or an association message of a station; and
- a message processing unit which selectively inserts the message received into a message regularly broadcasted in order to maintain the tree structure by the mesh portal based on the determination result,
- wherein the wireless mesh network uses a wireless mesh protocol (HWMP) including an ad hoc on-demand distance vector (AODV) routing protocol, and
- wherein the message regularly broadcasted by the mesh portal includes an address of the station coupled with an address of the mesh access point when the message received from the mesh access point is determined to be a disassociation message or an association message of the station,
- wherein the message processing unit comprises a processor.

14. The apparatus of claim 13, wherein the message processing unit no longer inserts the received message into the regularly broadcasted message, when a set period of time elapses.

* * * * *